United States Patent
Seong et al.

(10) Patent No.: US 9,569,090 B2
(45) Date of Patent: Feb. 14, 2017

(54) METHOD AND APPARATUS FOR PROVIDING GRAPHIC USER INTERFACE IN MOBILE TERMINAL

(75) Inventors: Jin Ha Seong, Seoul (KR); Min Kyung Kim, Seoul (KR); Kyu Sung Kim, Seoul (KR); Sung Sik Lee, Seoul (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 0 days.

(21) Appl. No.: 13/370,568

(22) Filed: Feb. 10, 2012

(65) Prior Publication Data

US 2012/0210273 A1   Aug. 16, 2012

Related U.S. Application Data

(60) Provisional application No. 61/463,044, filed on Feb. 11, 2011.

(30) Foreign Application Priority Data

Jun. 20, 2011   (KR) ................. 10-2011-0059417

(51) Int. Cl.
G06F 3/048 (2013.01)
G06F 3/0488 (2013.01)
G06F 3/0481 (2013.01)

(52) U.S. Cl.
CPC ........... *G06F 3/0488* (2013.01); *G06F 3/0481* (2013.01)

(58) Field of Classification Search
CPC  G06F 3/0481; G06F 19/3475; G06F 3/04883; G06F 3/0488

(Continued)

(56) References Cited

U.S. PATENT DOCUMENTS

2006/0036568 A1   2/2006  Moore et al.
2006/0093310 A1*  5/2006  Hung ............... G06F 3/165
                                                386/231

(Continued)

FOREIGN PATENT DOCUMENTS

CN         1177406 A       3/1998
JP       2005-250550 A     9/2005

(Continued)

OTHER PUBLICATIONS

Beginner tip home button, by Georgia, Published on Nov. 24, 2010.*

(Continued)

*Primary Examiner* — William Bashore
*Assistant Examiner* — Rayeez Chowdhury
(74) *Attorney, Agent, or Firm* — Cha & Reiter, LLC

(57) ABSTRACT

A method for providing a Graphic User Interface (GUI) associated with execution of an application in a mobile terminal supporting a multi-tasking function, and an apparatus implementing the same. The method for providing (GUI) in a mobile terminal, preferably includes: displaying an application execution icon region and application execution screen region configured by one or more application execution icons; receiving selection of one from the one or more application execution icons; and displaying a reduction mode execution screen of an application corresponding to the selected application execution icon on the application execution screen region. When using a multi-tasking function of a mobile terminal, the user can view a plurality of application execution screens on one screen, and input an operating command for a plurality of applications on one screen.

18 Claims, 16 Drawing Sheets

(58) Field of Classification Search
USPC .......................................................... 715/790
See application file for complete search history.

(56) References Cited

U.S. PATENT DOCUMENTS

| | | | | |
|---|---|---|---|---|
| 2006/0248471 | A1* | 11/2006 | Lindsay | G06F 3/0481 715/800 |
| 2007/0101297 | A1* | 5/2007 | Forstall et al. | 715/841 |
| 2008/0066007 | A1* | 3/2008 | Lau et al. | 715/783 |
| 2008/0195961 | A1* | 8/2008 | Bae et al. | 715/769 |
| 2008/0288876 | A1* | 11/2008 | Fleming | G06F 3/167 715/761 |
| 2008/0307364 | A1* | 12/2008 | Chaudhri et al. | 715/836 |
| 2009/0070695 | A1* | 3/2009 | Oh et al. | 715/769 |
| 2009/0315867 | A1 | 12/2009 | Sakamoto et al. | |
| 2010/0011321 | A1 | 1/2010 | Nakayama | |
| 2010/0066698 | A1* | 3/2010 | Seo | G06F 3/04883 345/173 |
| 2010/0085384 | A1* | 4/2010 | Kim et al. | 345/660 |
| 2010/0088597 | A1* | 4/2010 | Shin et al. | 715/704 |
| 2010/0100842 | A1 | 4/2010 | Kim | |
| 2010/0122195 | A1* | 5/2010 | Hwang | 715/769 |
| 2010/0138773 | A1 | 6/2010 | Schechter et al. | |
| 2010/0262928 | A1* | 10/2010 | Abbott | G06F 3/04817 715/769 |
| 2010/0309123 | A1 | 12/2010 | Sawai et al. | |
| 2010/0313164 | A1* | 12/2010 | Louch | G06F 3/0481 715/790 |
| 2010/0313165 | A1* | 12/2010 | Louch et al. | 715/792 |
| 2011/0071758 | A1* | 3/2011 | Cho | G01C 21/3682 701/431 |
| 2011/0124376 | A1* | 5/2011 | Kim | G06F 1/1626 455/566 |
| 2012/0274727 | A1* | 11/2012 | Robinson | H04N 7/15 348/14.07 |
| 2012/0274852 | A1* | 11/2012 | Jung | G06F 9/4443 348/564 |
| 2015/0286358 | A1 | 10/2015 | Kim et al. | |
| 2015/0355830 | A1 | 12/2015 | Chaudhri et al. | |

FOREIGN PATENT DOCUMENTS

| | | |
|---|---|---|
| JP | 2008-504610 A | 2/2008 |
| JP | 2009-217815 A | 9/2009 |
| JP | 2011-18085 A | 1/2011 |
| KR | 10-2005-0018145 A | 2/2005 |
| KR | 10-2010-0002423 A | 1/2010 |
| KR | 10-2010-0022612 A | 3/2010 |
| KR | 10-2010-0092613 A | 8/2010 |
| KR | 10-2010-0099447 A | 9/2010 |
| RU | 2 400 801 C2 | 4/2003 |
| RU | 2 409 833 C2 | 8/2005 |
| WO | 98/58323 A2 | 12/1998 |
| WO | 2008/086319 A1 | 7/2008 |

OTHER PUBLICATIONS

Japanese Notification of Reasons for Refusal dated Mar. 22, 2016.
Oguchi Hiroaki, Fully Understand the Basics of Pure Software, MacPeople Basic, ASCII Media Works, 2010, pp. 1-4.
Russian Notice of Patent Grant, dated Aug. 24, 2016.

* cited by examiner

[a]

[b]

[a]

[b]

[a]

[b]

METHOD AND APPARATUS FOR PROVIDING GRAPHIC USER INTERFACE IN MOBILE TERMINAL

CLAIM OF PRIORITY

Applicant claims the benefit of priority under 35 U.S.C. §119(e) based on U.S. provisional application No. 61/463,044 filed in the USPTO on Feb. 11, 2011, and under 35 U.S.C. §119(a) based on Korean Patent Application No. 10-2011-0059417 filed in the Korean Intellectual Property Office on Jun. 20, 2011, the entire contents of both documents being incorporated by reference in its entirety.

BACKGROUND OF THE INVENTION

Field of the Invention

The present invention relates to a method for providing a graphic user interface (GUI) in a mobile terminal. More particularly, the present invention relates to a method and apparatus for providing a GUI that is operable when more than one application is being executed in a mobile terminal.

Description of the Related Art

In the conventional multi-tasking function, a plurality of applications are simultaneously executed. However, because the applications are executed as a background, the user cannot view a plurality of applications. Accordingly, when the user accesses one application, the user can display another application in the form of pop-up. However, it is difficult to use two applications at one time, particularly on a small display such as a mobile display, tablet, PDA, etc. In addition, because there are often dependent applications, the user cannot access them in all situations.

With further regard to an event regarding an application being executed as a background occurs during the execution of one application, a function displaying an event alarm in the pop-up form is implemented. However, an interface capable of simultaneously operating a plurality of applications is not provided. Thus, there is a need in the art for a better way to access a display of multiple applications on a display.

SUMMARY OF THE INVENTION

The present invention provides a method for providing GUI capable of implementing a plurality of application execution screens on one screen, and an apparatus using the same.

In accordance with an exemplary aspect of the present invention, a method for providing Graphic User Interface (GUI) in a mobile terminal preferably includes: displaying an application execution icon region and application execution screen region configured by one or more application execution icons; receiving selection of one from the one or more application execution icons; and displaying a reduction mode execution screen of an application corresponding to the selected application execution icon on the application execution screen region.

In accordance with another exemplary aspect of the present invention, a mobile terminal for providing Graphic User Interface (GUI) preferably includes: a display unit that displays an application execution icon region and application execution screen region configured by one or more application execution icons; an input unit that receives selection of one from the one or more application execution icons; and a controller for controlling the display unit to display a reduction mode execution screen of an application corresponding to the selected application execution icon on the application execution screen region.

BRIEF DESCRIPTION OF THE DRAWINGS

The exemplary objects, features and advantages of the present invention will become more apparent to a person of ordinary skill in the art from the following detailed description in conjunction with the accompanying drawings, in which.

DETAILED DESCRIPTION

Figure 1:
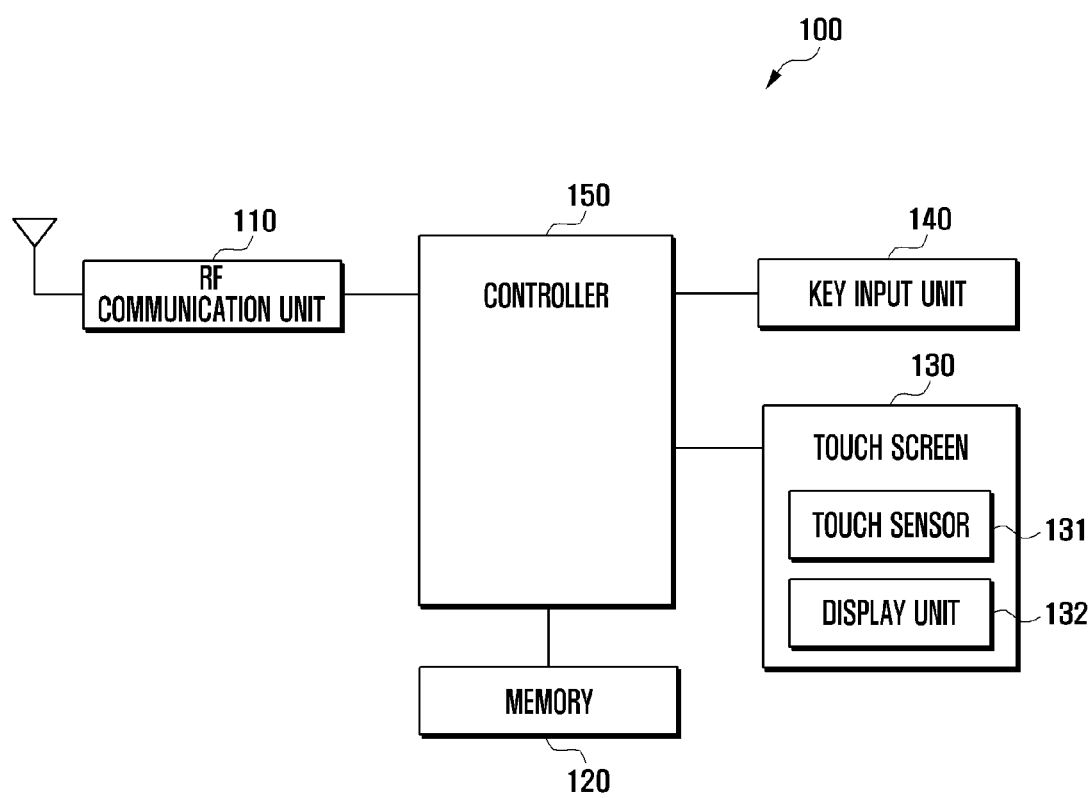
FIG. 1 is a block diagram illustrating a configuration of a mobile terminal according to an exemplary embodiment of the present invention.

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring appreciation of the subject matter of the present invention by a person of ordinary skill in the art with detailed descriptions of such well-known functions and structures.

As used herein, the term "application execution icon region" refers to a region in which at least one application execution icon is located. The application execution icon region is formed to distinguish from an application execution screen region. The application execution icon region may be comprised of a mini mode execution icon region and a full mode execution icon region. The mini mode execution icon region comprises a region in which an application execution icon for executing a mini-mode is located and the full mode execution icon region is a region in which an application execution icon for executing a full mode is located. The mini-mode execution icon region and the full mode execution icon region are displayed on the same location, and may be changed according to input of the user. As would be understood by the artisan, the mini-mode region is relatively smaller than the full mode region, as shown for example in FIG. 3.

As used herein, the term "indicator region" refers to a region in which at least one function key is located. The indicator region is displayed on the same location as that of the application execution icon region. The indicator region and the application execution icon region may be converted into each other according to input of the user. A back key, a home key, a recent execution list key, and a search key may be included in the indicator region in whole or in part. Further, a cue image may be included in the indicator region, in which the cue image indicates that the indicator region may be converted into another region.

As used herein, the term "menu bar region" refers to a region in which the application execution icon region and the indicator region are located.

As used herein, the term "application execution screen region" refers to a region on which an application execution screen, a home screen, and a menu screen are displayed. The application execution screen region is distinguished from the application execution icon region. The application mini mode execution screen and a full mode execution screen are displayed on the application execution screen region.

As used herein, the term "full mode execution screen" of an application refers to an execution screen configured by a full application execution screen region as one example of application execution screens. If the user touches or by another means such as key, stylus or voice, selects an application execution icon included on a home screen or a menu screen, then a full mode execution screen of an application is displayed.

As used herein, the term "mini mode execution screen" or "reduction mode execution screen" refers to an execution screen configured by a partial region of an application execution screen region as another form of an application execution screen. The mini mode execution screen is configured smaller than a full mode execution screen, and a mini mode execution screen and full mode execution screen for the same application may be configured by different GUIs. If the user touches or by another means such as key, stylus or voice, selects an application execution icon included in a mini mode execution icon region, a mini mode execution screen of an application is displayed.

A mobile terminal according to an exemplary embodiment of the present invention may become an information communication device and a multi-media device such as a Portable Multimedia Player (PMP), a Personal Digital Assistant (PDA), tablet device, or an MP3.

FIG. 1 is a block diagram illustrating a configuration of a mobile terminal according to an exemplary embodiment of the present invention. The mobile terminal 100 of the present invention preferably includes a radio frequency (RF) communication unit 110, a memory 120, a touch screen 130, a key input unit 140, and a controller 150.

The RF communication unit 110 performs wireless transmitting and receiving functions of corresponding data for RF communication in the mobile terminal 100. The RF communication unit 110 may include a transmitter (not shown) up-converting a frequency of a transmitted signal and amplifying the signal, a receiver (not shown) low-noise-amplifying a received signal and down-converting the signal. Further, the RF communication unit 110 receives data through an RF channel and outputs the received data to the controller 150. The RF communication unit 110 may transmit data output from the controller 150 through the RF channel.

The memory 120 is a non-transitory machine readable medium having structural elements for storing programs and data utilized in operating the mobile terminal 100, and may store data such as applications, images, audios, and videos.

The touch screen 130 preferably includes a touch sensor 131 and a display unit 132. The touch sensor 131 is a structural element for sensing touch input of the user. The touch sensor 131 may comprise a capacitive overlay touch sensor or a resistive overlay touch sensor, just to name two possible non-limiting examples. Besides the foregoing sensors, various types of sensor devices capable of sensing contact of an object may be configured by a touch sensor 131 of the present invention. The touch sensor senses touch input of the user and generates and transmits a sensing signal to the controller 150. The sensing signal includes coordinate data that the user input a touch. When the user inputs a touch location moving operation, the touch sensor 131 generates and transmits a sensing signal including coordinate data of a touch location moving path to the controller 150.

The display unit 132 may be configured preferably by a Liquid Crystal Display (LCD), an Organic Light Emitting Diode (OLED), or an Active Matrix Organic Light Emitting Diode (AMOLED), or other types of thin film technology displays. The display unit 132 visibly provides data stored in the mobile terminal 100 or input data to the user. The display unit 132 of the present invention displays an application execution icon region and an application execution screen region configured by at least one application execution icon. When one application execution icon is selected and input, a mini mode execution screen of an application corresponding to the selected application execution icon is displayed on an application execution screen region.

The key input unit 140 is an input device formed at region other than the touch screen 130 in the mobile terminal, and creates and transfers an input signal to the controller 150 as in the touch sensor 131. The key input unit 140 may be configured by a key pad including numeral keys and arrow keys, or by separate keys. The key input 140 may be configured by a button type or a touch sensor type. In an embodiment of the present invention, the key input unit 140 may be omitted from a mobile terminal capable of performing various operations by only the touch screen 130. The configuration of the keypad can be of any known type, including but in no way limited to QWERTY, DVORAK, 12-key telephone pad, alphanumeric, etc.

The controller 150 is a structural element for controlling an overall operation of the mobile terminal 100.

The controller 150, which may comprise a processor or microprocessor, according to an exemplary embodiment of the present invention controls the display unit 132 to display an application execution icon region and an application execution screen region configured by at least one application execution icon. If the controller 150 receives selection of any one application execution icon from the user through the touch sensor 131, the controller controls the display unit 132 to display a mini mode execution screen of an application corresponding to the selected application execution icon on an application execution screen region.

The controller 150 of the present invention controls the display unit 132 to display an indicator region with at least one function key and an application execution screen region. If a touch location moving operation to an application execution screen region is received by a touch sensor(s) after touching an indicator region from the user through the touch sensor 131, the controller 150 may control the display unit 132 to change the indicator region to an application execution icon region configured by at least one application execution icon and display the changed application execution icon region. Next, if the user selects one application execution icon, the controller 150 may display a mini mode execution screen corresponding to the selected application execution icon on an application execution screen region.

If the controller 150 receives from touch sensor a touch location moving operation in a direction toward an indicator region after touching a mini mode execution screen through the touch sensor 131 while an indicator region and a mini mode execution screen of an application are displayed, the controller controls the display unit 132 to move and display a mini mode execution screen according to the touch location moving operation.

The controller 150 also preferably controls the display unit 132 to move and display mini mode execution screen, and determines whether a center of the mini mode execution screen extends to an indicator region.

If the controller is determined that the center of the mini mode execution screen extends to the indicator region, the controller 150 controls the display unit 132 to change and display an indicator region in an application execution icon region. If it is determined that the center of the mini mode execution screen does not extend to the indicator region, the controller 150 maintains display of the indicator region. The controller 150 determines whether or not a touch moving location reaches an application execution icon region through the touch sensor 131. If it is determined that the touch moving location reaches the application execution icon region, the controller 150 terminates an application of a mini mode execution screen. If it is determined that the touch moving location does not reach the application execution icon region, the controller 150 maintains an application execution state of a mode execution screen.

The controller 150 of the present invention also preferably controls the display unit 132 to display a focused mini mode execution screen and full mode execution screen and determines whether or not an event occurs in an application displayed on a full mode execution screen. If the controller determines that the event occurs, the controller 150 controls the display unit 132 to display a pop-up window including an 'OK key' and a 'Cancel key'. If the controller determines that the 'OK key' is selected through the touch sensor 131, the controller 150 then controls the display unit 132 to move and display a focus to a full mode execution screen. If the controller is determined that the 'Cancel key' is selected, the controller 150 maintains a focus state of a mini mode execution screen.

The foregoing exemplary embodiment has illustrated a configuration of a mobile terminal 100 according to the present invention. Hereinafter, a method for providing a GUI supporting a multi-tasking function in the mobile terminal 100 will now be described.

Figure 2:
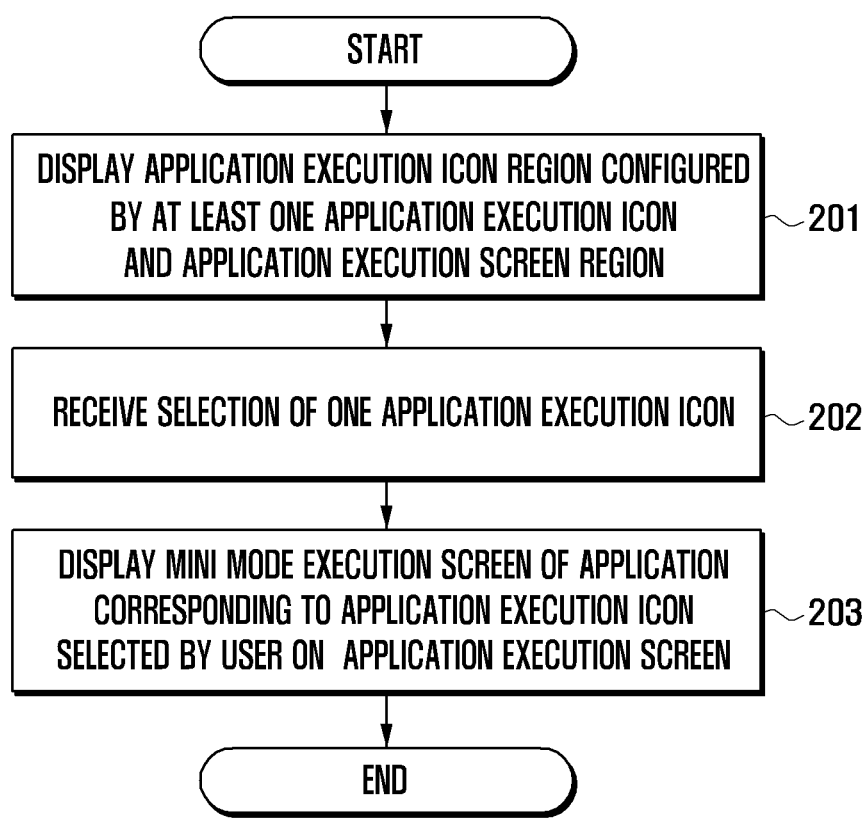
FIG. 2 is a flowchart illustrating exemplary a method for providing GUI in a mobile terminal according to an exemplary embodiment of the present invention.

FIG. 2 is a flowchart illustrating exemplary operation of a method for providing GUI in a mobile terminal according to an exemplary embodiment of the present invention.

At (201) a controller 150 preferably controls a display unit 132 to display an application execution icon region configured by at least one application execution icon and an application execution screen region. For example, the controller 150 may control the display unit 132 to display an application execution icon region at a lower end of the display unit 132 in the form of a bar and an application execution screen region at an upper part of the application execution icon region. In this particular case, at least one application execution icon is arranged in a left and right direction in the application execution icon region.

According to an exemplary aspect of the present invention, a home screen configured by a menu icon or widget, a menu screen configured by the menu icon, or a full mode execution screen of an application may be included in the application execution screen region. The controller 150 preferably controls the display unit 132 in an idle state to display a home screen or a menu screen in an application execution screen region. The controller 150 also preferably controls the display unit 132 in an application execution state to display a full mode execution screen of a corresponding application.

At (201), the controller 150 receives selection of one application execution icon through the touch sensor 131. When the full mode execution screen of an application is displayed on the application execution screen region, the touch screen has sensed that the user has touched an application execution icon to perform multi-tasking for another application and the controller 150 recognizes an application execution icon touched by the user through the touch sensor 131.

In an exemplary embodiment of the present invention, if the user selects preferably by tactile selection an application execution icon and then inputs a touch location moving operation to an application execution screen region, the controller 150 may determine whether an application execution icon selected by the user through the touch sensor 131 and recognize the selection as an execution command of a corresponding application. In this particular case, it is preferred that the input touch location moving operation is drag and drop that is sensed when a user touches an application execution icon, moves into an application execution screen region, and then release the touch.

Next, at (203) the controller 150 controls the display unit 132 to display a mini mode execution screen of an application corresponding to an application execution icon selected by the user on an application execution screen. The controller 150 executes an application corresponding to the application execution icon selected by the user, configures and displays a mini mode execution screen on the display unit 132. The mini mode execution screen preferably comprises an execution screen configured by a partial region of the application execution screen region, and is displayed on a home screen, a menu screen, or an upper layer of a full mode execution screen of an application. In a case of an application displayed on the mini mode execution screen in the present invention, the mini mode execution screen and a full mode execution screen may be configured by different GUIs.

Figure 3:
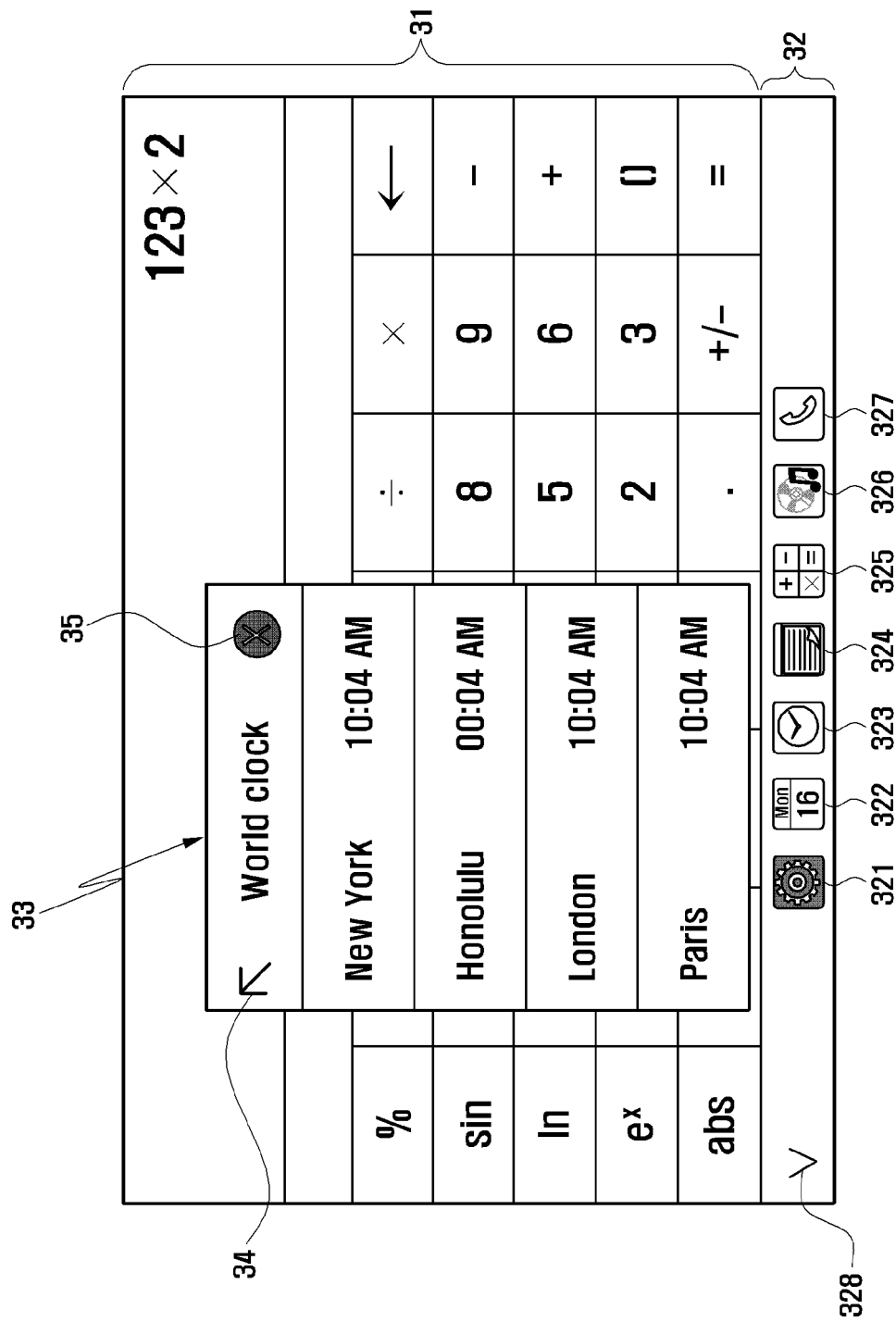
FIG. 3 is an example of a screenshot of a mobile terminal displayed in a procedure of FIG. 2.

FIG. 3 is a view illustrating an example of a screen of a mobile terminal displayed in a procedure of FIG. 2.

FIG. 3 illustrates the display an application execution screen region 31, application execution icon region 32, and a mini mode execution screen 33. A full mode execution screen of a 'calculator' application is displayed on the application execution screen region 31. The mini mode execution screen 33 is a 'world time' application execution screen, and is displayed on a foreground of the 'calculator' application execution screen. In the example shown in FIG. 3, the mini mode execution screen 33 includes a full mode change key 34 and a termination key 35. To change the 'world time' application to a full mode, the user touches a full mode change key 34. In order to termination the 'world time' application, the termination key 35 is input.

A plurality of application execution icons 321 to 327 is included in the application execution icon region 32. An application execution icon list included in the application execution icon region 32 may be reset by the user, and the user may construct an application execution icon region 32 by application execution icons of a frequently used application. FIG. 3 illustrates a result when the user touches an icon 323 corresponding to an execution icon of the 'world time' application. An application execution icon region termination key for changing an application execution icon region 32 to another region may be included in the application execution icon region 32. In the present invention, an application execution icon 32 region may be changed to an indicator region configured by function keys.

Figure 4:
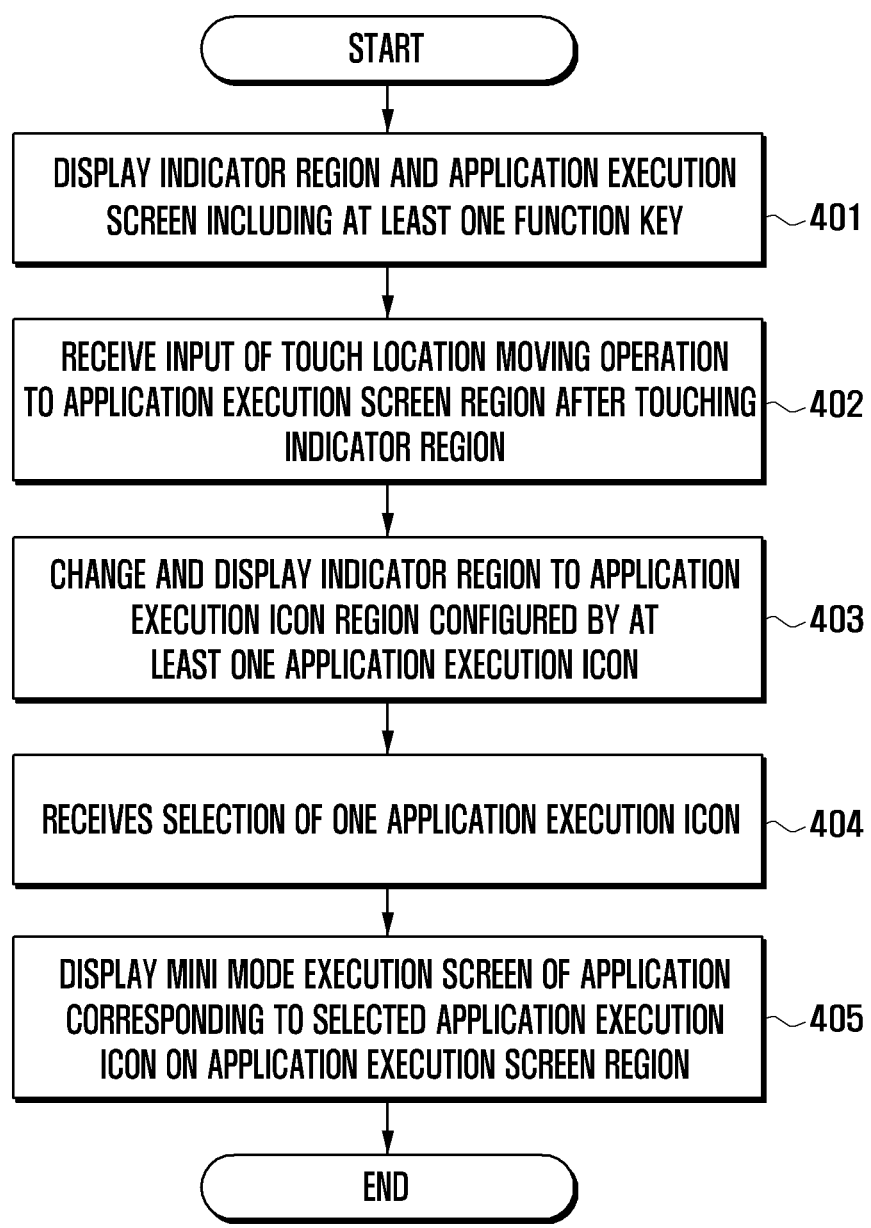
FIG. 4 is a flowchart illustrating exemplary operation a method for providing GUI in a mobile terminal according to another exemplary embodiment of the present invention.

FIG. 4 is a flowchart illustrating exemplary operation of a method for providing GUI in a mobile terminal according to another exemplary embodiment of the present invention.

FIG. 4 illustrates an exemplary embodiment such that an application execution icon region and an indicator region may be changed. In this case, the user inputs and changes an application execution icon region termination key.

At (401), the controller 150 controls the display unit 132 to display an indicator region and an application execution screen including at least one function key. In the present invention, a number of keys such as a back key, a home key, a recent execution list key, and a search key may be included in the indicator region. As shown in FIG. 3, a home screen, a menu screen, and a full mode execution screen of an application may be displayed on the application execution screen region.

At (402), the touch sensor senses a touch input and notifies controller 150 regarding receipt of an input of a touch location moving operation to an application execution screen region after touching the indicator region. It is preferred that the touch location moving operation input at step 402 is a flick operation comprising directly releasing the touch after performing a touch operation higher than a preset speed.

At (403), the controller 150 controls the display unit 132 to change and display an indicator region to an application execution icon region configured by at least one application execution icon. In this case, the controller 150 controls the display unit 132 to change the indicator region to an application execution icon region while displaying an effect image of a rotated bar.

At (404), the controller 150 receives selection of one application execution icon through the touch sensor 131.

Next, at (405), the controller 150 controls the display unit 132 to display a mini mode execution screen of an application corresponding to the selected application execution icon on the application execution screen region.

A change key for changing to the application execution icon region may be included in the indicator region according to an exemplary embodiment of the present invention. If the user touches the change key, the controller 150 controls the display unit 132 to change the indicator region to an application execution icon region, and to display the application execution icon region.

In an exemplary embodiment of the present invention, an application execution icon region termination key may be included in the application execution icon region. If the user touches the key, the controller 150 controls the display unit 132 to change the application execution icon region to the indicator region.

In a state that the application execution icon region is displayed, when the touchscreen senses that the user touches the application execution icon region and inputs a touch location moving operation of a downward direction (opposite to a direction toward application execution screen region), the controller 150 controls the display unit 132 to change display of the application execution icon region to the indicator region. In this particular case, it is preferred that an input touch location moving operation is a flick operation.

In an exemplary embodiment of the present invention, the controller 150 controls the display unit 132 to change display of the indictor region to an application execution icon region, drives the timer, and determines whether a preset time T elapses. The controller determines that the preset time T elapses, and the controller 150 may control the display unit 132 to display of an application execution icon region to that of the indicator region.

In the present invention, the application execution icon region may preferably include a mini mode execution icon region and a full mode execution icon region. Three regions, for example, an indicator region, a mini mode execution icon region, and a full mode execution icon region may be sequentially changed in a lower part of the application execution screen region being displayed. The mini mode execution icon region and the full mode execution icon region are configured by at least one application execution icon. If an icon included in the mini mode execution icon region is selected, the controller 150 constructs and displays a mini mode execution screen of a corresponding application on the display unit 132. If the icon included in the full mode execution icon region is selected, the controller 150 constructs and displays a full mode execution screen of a corresponding application on the display unit 132.

Figure 5:
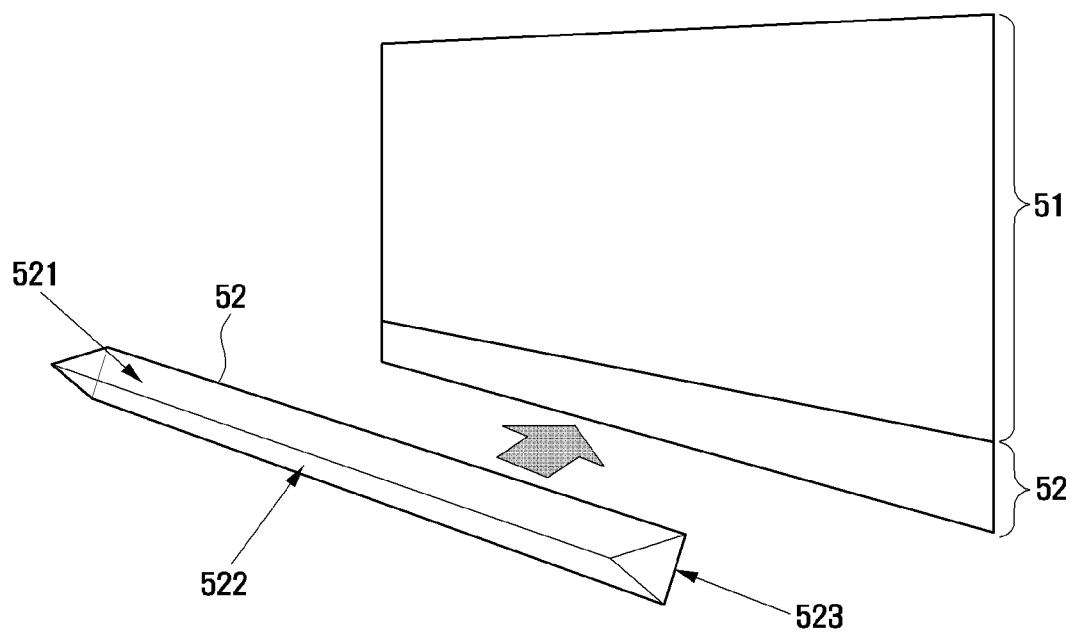
FIG. 5 is a view illustrating a screen configuration of a mobile terminal according to an exemplary embodiment of the present invention.

FIG. 5 is a perspective view illustrating a screen configuration of a mobile terminal 100 according to an exemplary embodiment of the present invention.

Now referring to FIG. 5, an application execution screen region 51 and a menu bar region 52 are shown. The menu bar region 52 has a menu bar of a three-dimensional stick shape, and the menu bar is configured by three surfaces. The menu bar includes an indicator region 521, a mini mode execution icon region 522, and a full mode execution icon region 523. The menu bar is rotated in an upward or downward direction according to user input. The menu bar region 52 is changed to one of a mini mode execution icon region 522 or a full mode execution icon region 523 and the changed region is displayed.

Figure 6:
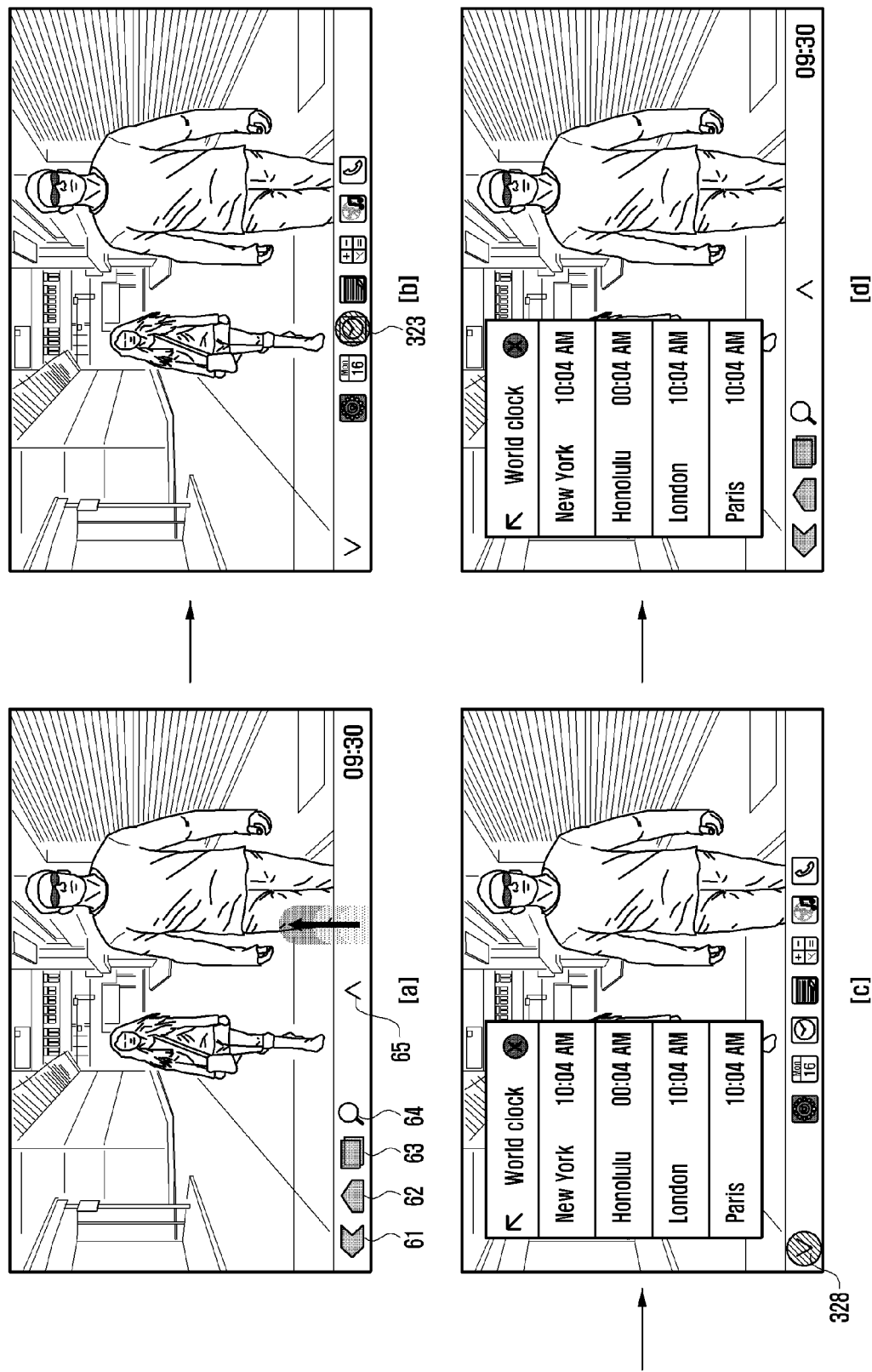
FIG. 6 is a view illustrating an example of a screenshot of a mobile terminal displayed in a procedure of FIG. 4.

FIG. 6 is a view illustrating an example of a screenshot of a mobile terminal 100 displayed in accordance with a procedure of FIG. 4.

FIG. 6[*a*] illustrates a moving image playback application and indication region configured by a full mode execution screen. The indicator region preferably includes, for example, a previous key 61, a home key 62, a recent execution list key 63, and a search key 64. A cue for indicating a changing to another region and a current time are included in the indicator region. FIG. 6[*a*] illustrates a form that the user touches the indicator region and then inputs a touch location moving operation to the application execution screen region.

FIG. 6[*b*] illustrates a screen display has changed when the user touches the indicator region in FIG. 6[*a*] and then inputs a touch location moving operation to an application execution screen region. In FIG. 6[*b*], the indicator region is changed to an application execution icon region and the changed application execution icon region is displayed.

An application execution icon region of FIG. 6[b] is a mini mode execution icon region. Further, FIG. 6[b] illustrates a form that the user selects a world time application execution icon 323.

FIG. 6[c] illustrates a screen display has changed when the user selects a world time application execution icon 323 in FIG. 6[b]. FIG. 6[c] illustrates a form that a mini mode execution screen of a world time application is displayed on an upper layer of a full mode execution screen of a moving image application. So as to again change an application execution icon region to an indicator region, the user selects an application execution icon region terminal key 328.

FIG. 6[d] illustrates a screen display has changed when the user selects an application execution icon region termination key 328 in FIG. 6[c], which illustrates the application execution icon region changed from the application execution icon region.

Figure 7:
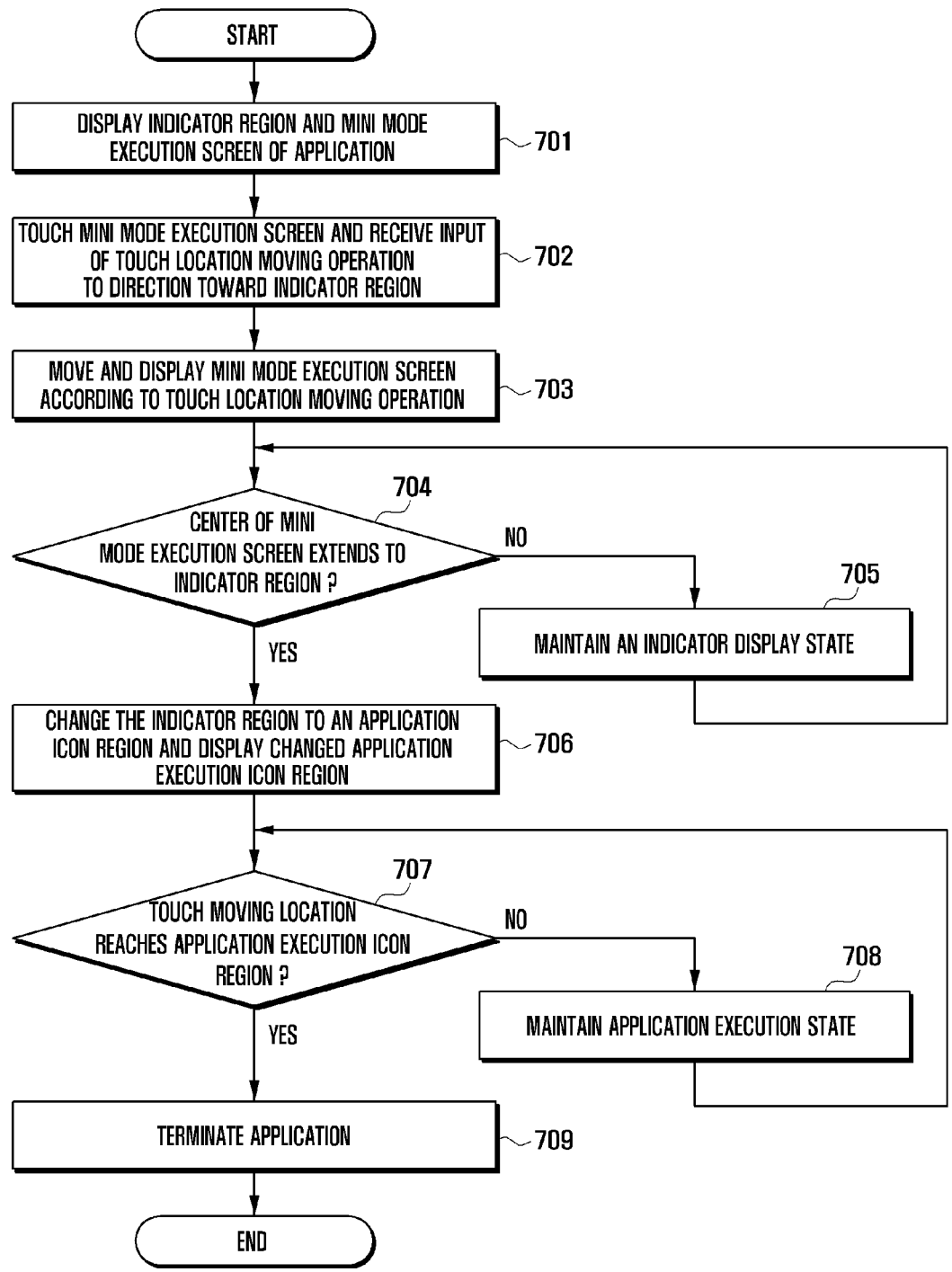
FIG. 7 is a flowchart illustrating exemplary operation of a method for providing GUI in a mobile terminal according to a further exemplary embodiment of the present invention.

FIG. 7 is a flowchart illustrating exemplary operation of a method for providing GUI in a mobile terminal according to a further exemplary embodiment of the present invention. FIG. 7 is an exemplary embodiment of a procedure terminating an application executed in a mini mode.

Now referring to FIG. 7, at (701), the controller 150 controls a display unit 132 to display an indicator region and a mini mode execution screen of an application. Step 701 shows a display state where the application execution icon region is again changed to the indicator region after step 203 or step 405 of FIG. 4.

At 702, in response to sensing a touch by the touch sensor 131 of a mini mode execution screen, the controller 150 controls receives input of a touch location moving operation to a direction toward the indicator region. The user touches can terminate current application executed in a mini mode by touching a mini mode execution screen, and then inputs a touch location moving operation to a direction toward the indicator region which is sensed by the touch screen.

At (703), the controller 150 controls the display unit 132 to move and display the mini mode execution screen according to the sensed touch location moving operation.

At 704, the controller 150 determines whether or not a center of a mini mode execution screen extends/occupies an indicator region. If the user touches and moves the mini mode execution screen downward, the controller 150 controls the display unit 132 to move and display a mini mode execution screen. If a lower end of the mini mode execution screen extends to the indicator region, a mini mode execution screen is displayed on a lower layer of an indicator region. Next, the controller 150 determines whether a center of the mini mode execution screen reaches an indicator region. In this case, the controller 150 may determine whether or not a center line of an upper end and a lower end of the mini mode execution screen reaches the indicator region.

At 704, if it is determined that a center of the mini mode execution screen does not occupy the indicator region, then at 705 the controller 150 controls the display unit 132 to maintain an indicator display state.

When the center of the mini mode execution screen extends to the indicator region, then at (706) the controller 150 controls the display unit 132 to change the indicator region to an application execution icon region and display changed application execution icon region. In this case, the controller 150 controls the display unit 132 to display a focus in an application execution icon corresponding to an application executed in a mini mode.

At (707), the controller 150 determines whether or not a touch moving location extends to an application execution icon region through the touch sensor 131. The user moves a touch to an application execution icon region for terminating an application and then releases a touch.

If at 707 the controller determines that the touch moving location does not extend into an application execution icon region, then at (708) the controller 150 maintains an application execution state.

When it is determined that the touch moving location extends to an application execution icon region, then at (709) the controller 150 terminates a corresponding application.

When the application is terminated, the controller 150 controls the display unit 132 to display an effect image in which a mini mode execution screen is reduced and converged to a corresponding application execution icon direction.

In an exemplary embodiment of the present invention, an application termination key may be included on the mini mode execution screen. If the user touches the application termination key, the controller 150 may terminate execution of a corresponding application. Further, when the user touches a back key included in the indicator region, the controller 150 may terminate an execution state of a current application executed in a mini mode.

Figure 8:
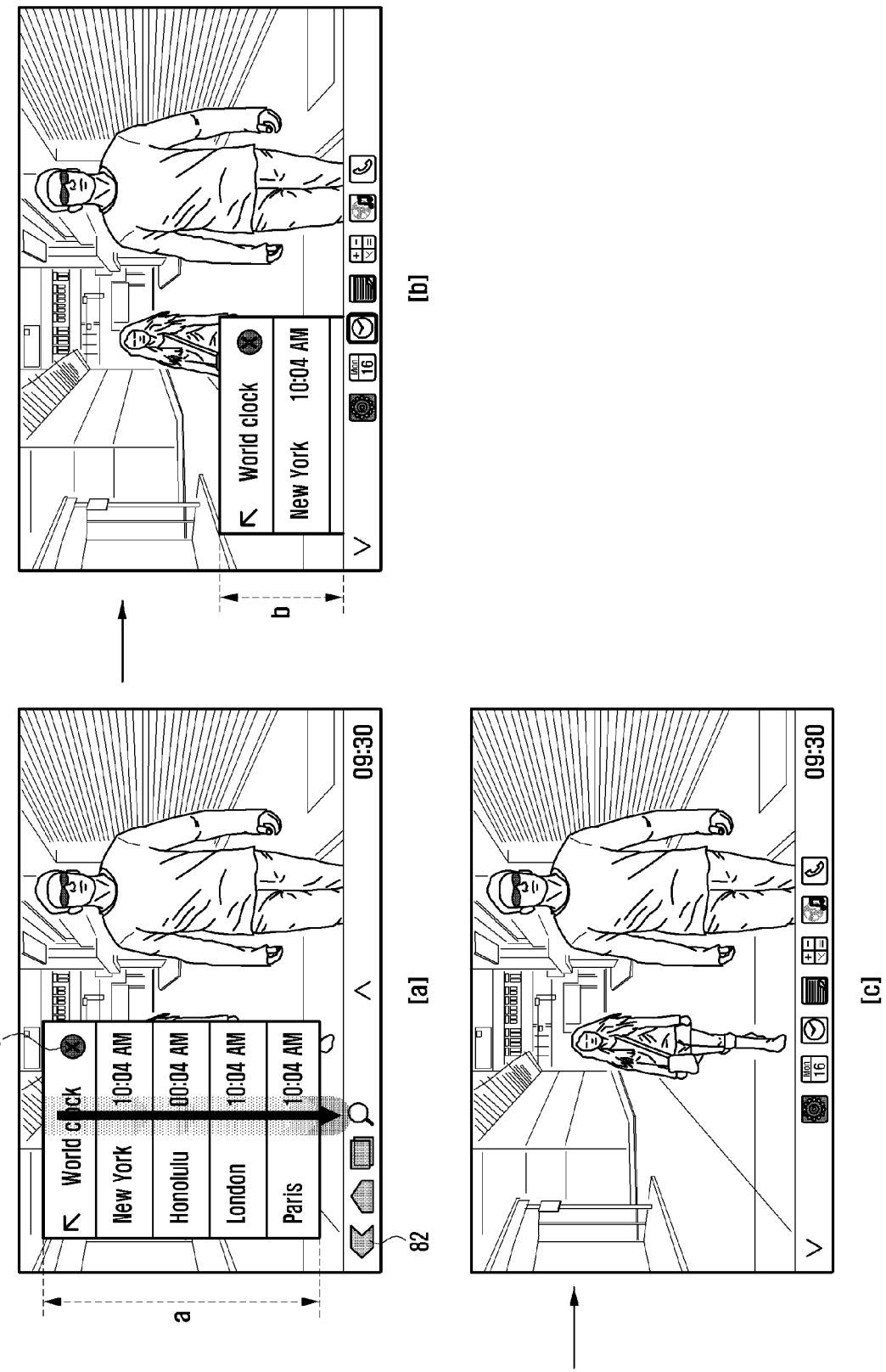
FIG. 8 is a view illustrating an example of a screenshot of a mobile terminal displayed in a procedure of FIG. 7.

FIG. 8 is a view illustrating an example of a screen of a mobile terminal displayed operating a procedure according to FIG. 7.

FIG. 8[a] illustrates a moving image playback application configured by a full mode execution screen, a world time application configured by a mini mode execution screen, and an indicator region, which illustrates a form that a user touches a mini mode execution screen and then input a touch location moving operation to a direction toward an indicator region. In FIG. 8[a], an 'a' indicates a distance between an upper end and a lower end of a mini mode execution screen.

FIG. 8[b] illustrates a screen changed when the user touches a mini mode execution screen and inputs a touch location moving operation to a direction toward an indicator region by a predetermined distance. A mini mode execution screen in FIG. 8[b] is moved downward in comparison with that in FIG. 8[a]. A part of the mini mode execution screen is displayed on an application execution screen region, and a remaining part thereof is shielded under the application execution icon region. An indicator region of FIG. 8[a] is changed to an application execution icon region and the changed application execution icon region is displayed. The controller 150 determines whether a length b of a currently displayed mini mode execution screen is a half (½*a) of a total length of a mini mode execution screen. When "b" in 8B is less than ½*a, the controller 150 controls the display unit 132 to change an indicator region to an application execution icon region, and display the changed application execution icon region. FIG. 8[b] illustrates a form in which a focus is displayed in an execution icon of a current world time application executed in a mini mode. Subsequently, the user continuously moves a touch location to an application execution icon region.

FIG. 8[c] illustrates a screen changed when the user moves the touch location to an application execution icon region. A mini mode execution screen of a world time application disappears from FIG. 8[c], and only a full mode execution screen of a moving image playback application is displayed on an application execution screen region.

FIG. 8[c] illustrates a form in which a world time application is removed together with a focus appearing during an execution of a current mini mode as execution of a world time application is terminated in comparison with FIG. 8[b].

In an exemplary embodiment of the present invention, if the user inputs a termination key included in a mini mode execution screen or inputs a back key 82 included in an indicator region in FIG. 8[*a*], the controller 150 may terminate an application executed in the mini mode and control the display unit 132 to eliminate a mini mode execution screen and display a remainder as shown in FIG. 8[*c*].

In the present invention, when terminating an application executed in a mini mode, the controller 150 may control the display unit 132 to display an effect image in which a mini mode execution screen is reduced and converged to an execution icon of a corresponding application. Further, selection of an application execution icon is input from the user, the controller 150 may control display of an effect image of a form that a mini mode execution screen of an application corresponding to the selected application execution icon is enlarged from an application execution icon.

Figure 9:
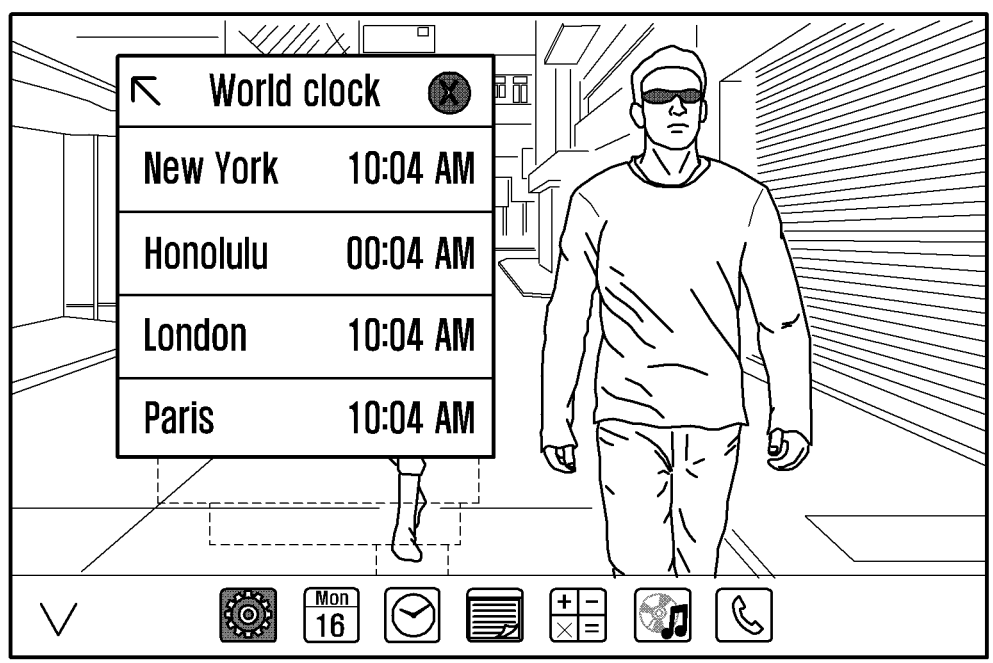
FIG. 9 is a view illustrating an example of a screenshot of a mobile terminal displayed upon termination of an application according to an exemplary embodiment of the present invention.

FIG. 9 is a view illustrating an example of a screen on a mobile terminal 100 displayed upon termination of an application according to an exemplary embodiment of the present invention. FIG. 9 illustrates a form that a mini mode execution screen of a world time application is reduced to a direction toward a world time application execution icon.

In an exemplary embodiment of the present invention, a full mode change key may be included in a mini mode execution screen. If the user selects a full mode change key, the controller 150 controls the display unit 132 to change a mini mode execution screen to a full mode execution screen, and display the changed full mode execution screen.

Figure 10:
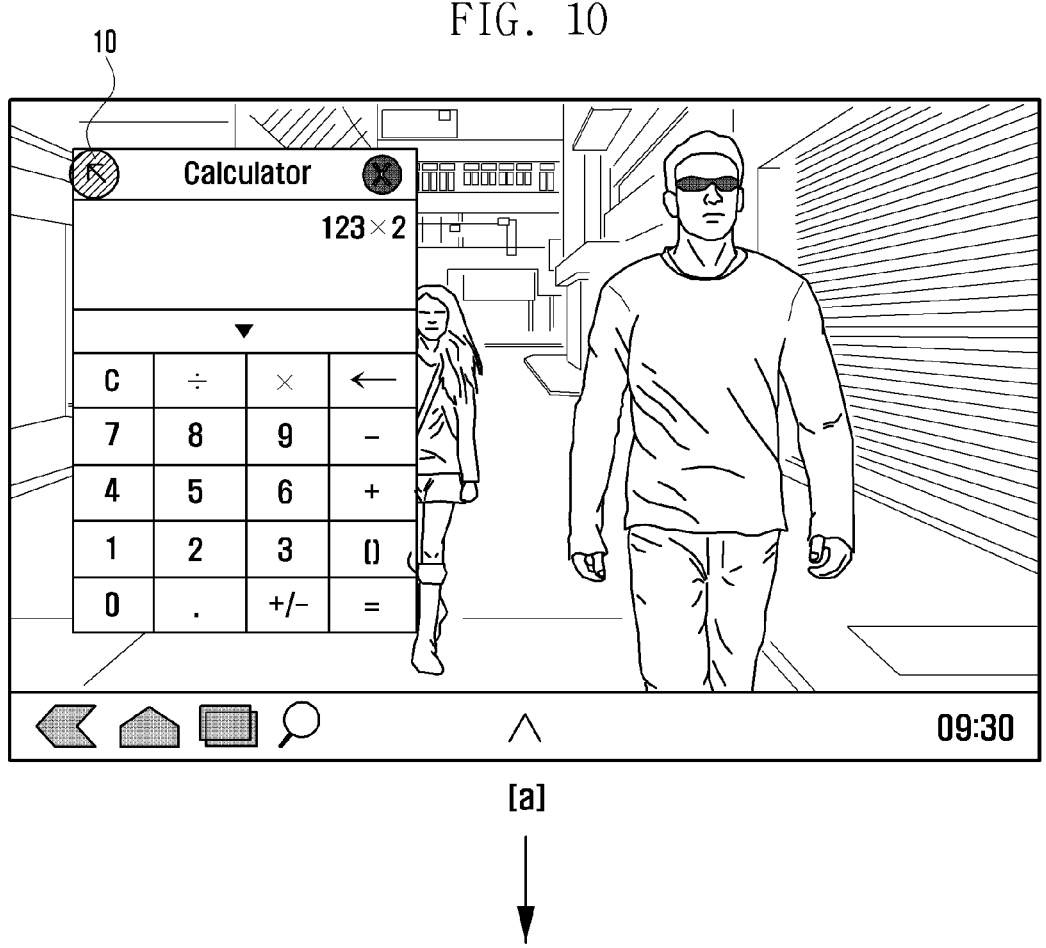
FIG. 10 is a view illustrating a change of form from a mini mode execution screen to a full mode execution screen.
Figure 10:
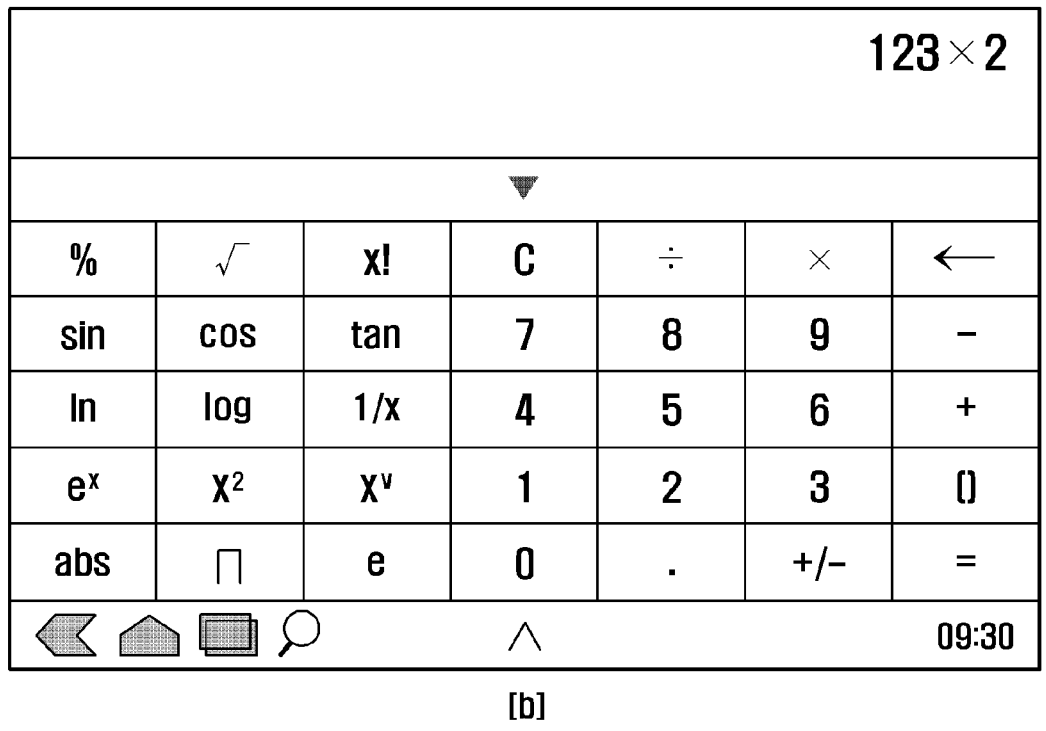

FIG. 10 is a view illustrating a change form from a mini mode execution screen to a full mode execution screen.

In FIG. 10[*a*], a calculation application is displayed on a mini mode execution screen, and a full mode change key 10 is included in a mini mode execution screen. To use the calculator application as a full mode, the user inputs a full mode change key 10.

FIG. 10[*b*] illustrates a screen changed when the user inputs a full mode change key 10 in FIG. 10[*a*]. An application execution screen region in FIG. 10[*b*] is configured by a full mode execution screen of a calculator application.

In an exemplary embodiment of the present invention, a mini mode execution screen and full mode execution screen for the same application may be displayed on a single screen. If the user selects an execution icon for the same application from an application execution icon region while executing a certain application in a full mode, the controller 150 controls the display unit 132 to display a mini mode execution screen on an upper layer of a full mode execution screen.

Figure 11:
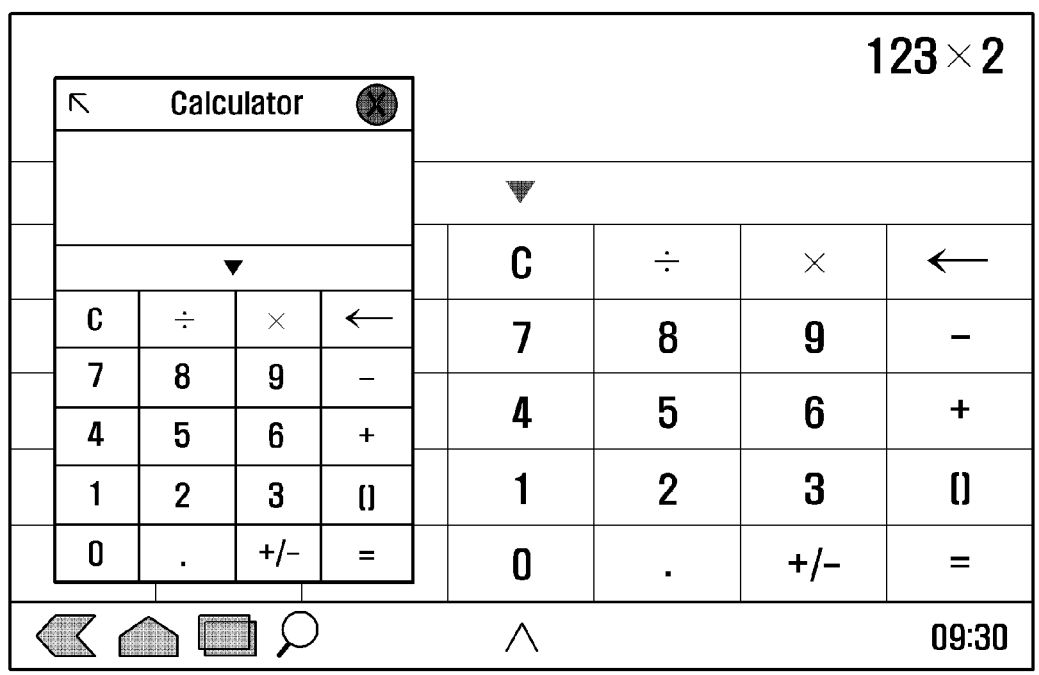
FIG. 11 is a view illustrating a form that a mini mode execution screen and a full mode execution screen in the same application are displayed on one screen.

FIG. 11 is a view illustrating a format in which a mini mode execution screen and a full mode execution screen in the same application are displayed on one screen. An application execution screen region of FIG. 11 includes a full mode execution screen and a mini mode execution screen of a calculator application. A focus may be changed (swapped) between a full mode execution screen and a mini mode execution screen. The user may move the focus to selectively use the full mode execution screen and a mini mode execution screen. In other words, in FIG. 11, the user a calculator application of a mini mode execution screen and calculator application of a full mode execution screen are different applications.

Figure 12:
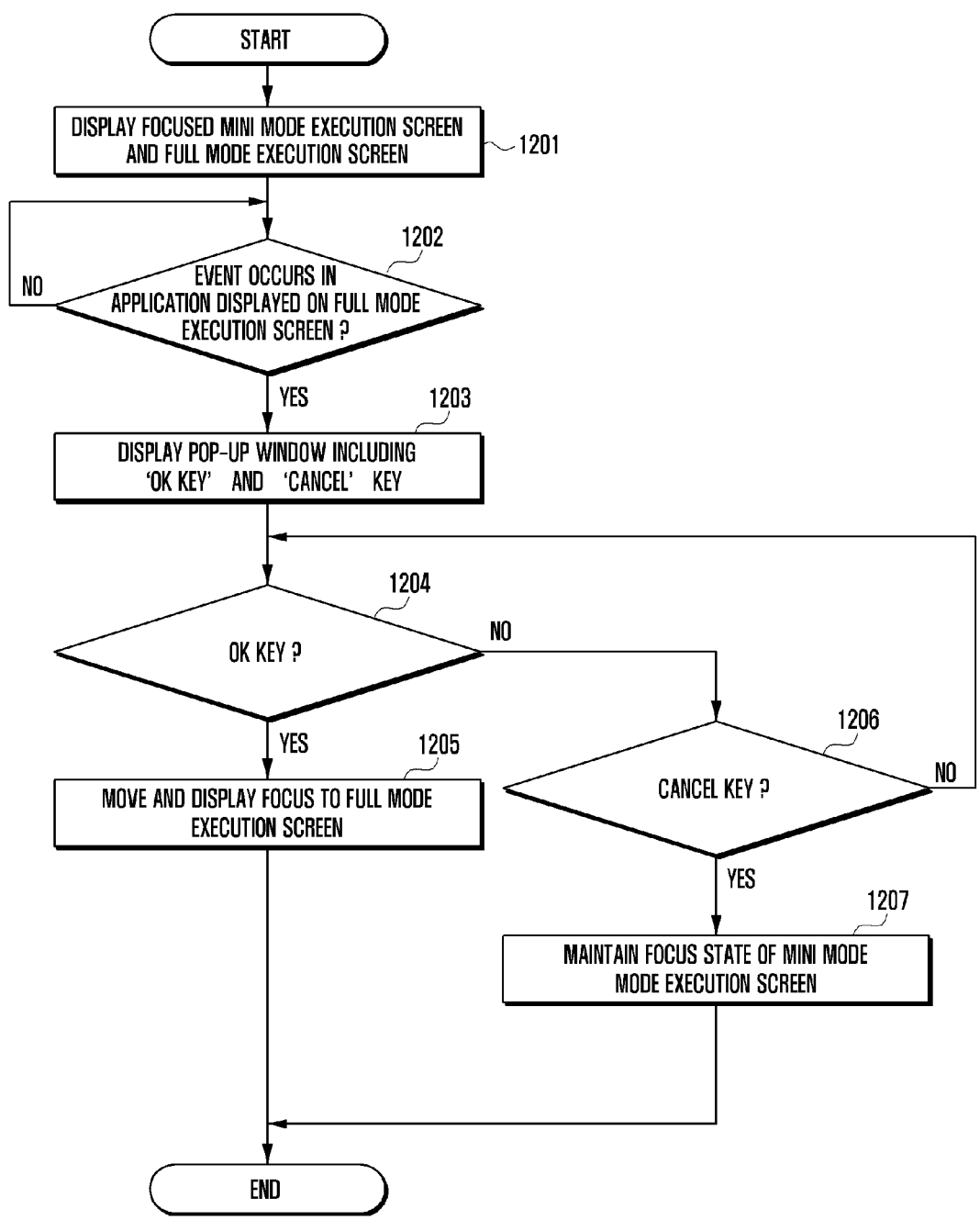
FIG. 12 is a flowchart illustrating exemplary operation of a method for providing GUI in a mobile terminal according to another exemplary embodiment of the present invention.

FIG. 12 is a flowchart illustrating exemplary operation of a method for providing GUI in a mobile terminal according to another exemplary embodiment of the present invention. FIG. 12 illustrates an exemplary embodiment of a processing procedure when an event occurs in an application executed in a full mode where a mini mode execution screen and a full mode execution screen are displayed.

Referring now to FIG. 12, at (1201) a controller 150 controls a display unit 132 to display a focused mini mode execution screen and full mode execution screen. The controller 150 controls the display unit 132 to display a full mode execution screen of a first application, and display a mini mode execution screen of a second application on a full mode execution screen according to a user command. In this case, the controller 150 controls the display unit 132 to display a focus on a mini mode execution screen.

At (1202), the controller 150 determines whether an event occurs in an application displayed on a full mode execution screen. When the application displayed on the full mode execution screen is an application associated with a time or schedules, the event may become an alarm. When the application displayed on the full mode execution screen is a call application, the event may become a call destination event. When the application displayed on the full mode execution screen is a message application, the event may become a received alarm.

When it is determined that the event occurs, at (1203) the controller 150 controls the display unit 132 to display a pop-up window including an 'OK key' and a 'Cancel' key. In the present invention, the 'OK key' is key for inputting a confirmation command such as Ok, confirm, done, or delete. In this case, the pop-up window is displayed on an upper layer of a mini mode execution screen.

At (1204), the controller 150 determines whether an 'OK' key input is signaled through a touch sensor 131 or a key input unit 140 is signaled.

When the controller determines that the 'OK' key is input, then at (1205) the controller 150 controls the display unit 132 to move and display a focus to a full mode execution screen. To select the 'OK key' by the user may be recognized as a command confirming or selecting the event, and the controller 150 focuses an application of a full mode execution screen generating the vent.

If the 'OK key' is not selected at step 1204, then at (1206) the controller 150 determines whether a 'Cancel key' is input through the touch sensor 131 or the key input unit 140.

If the controller determines that the 'cancel key' is input, then at (1207) the controller 150 controls the display unit 132 to maintain a focus state of a mini mode execution screen. To select the 'cancel key' by the user may be accepted as a command confirming an event later and preferentially using a currently focused mini mode execution screen, and the controller 150 controls the display unit 132 to continuously maintain a focus state of a mini mode execution screen.

Figure 13:
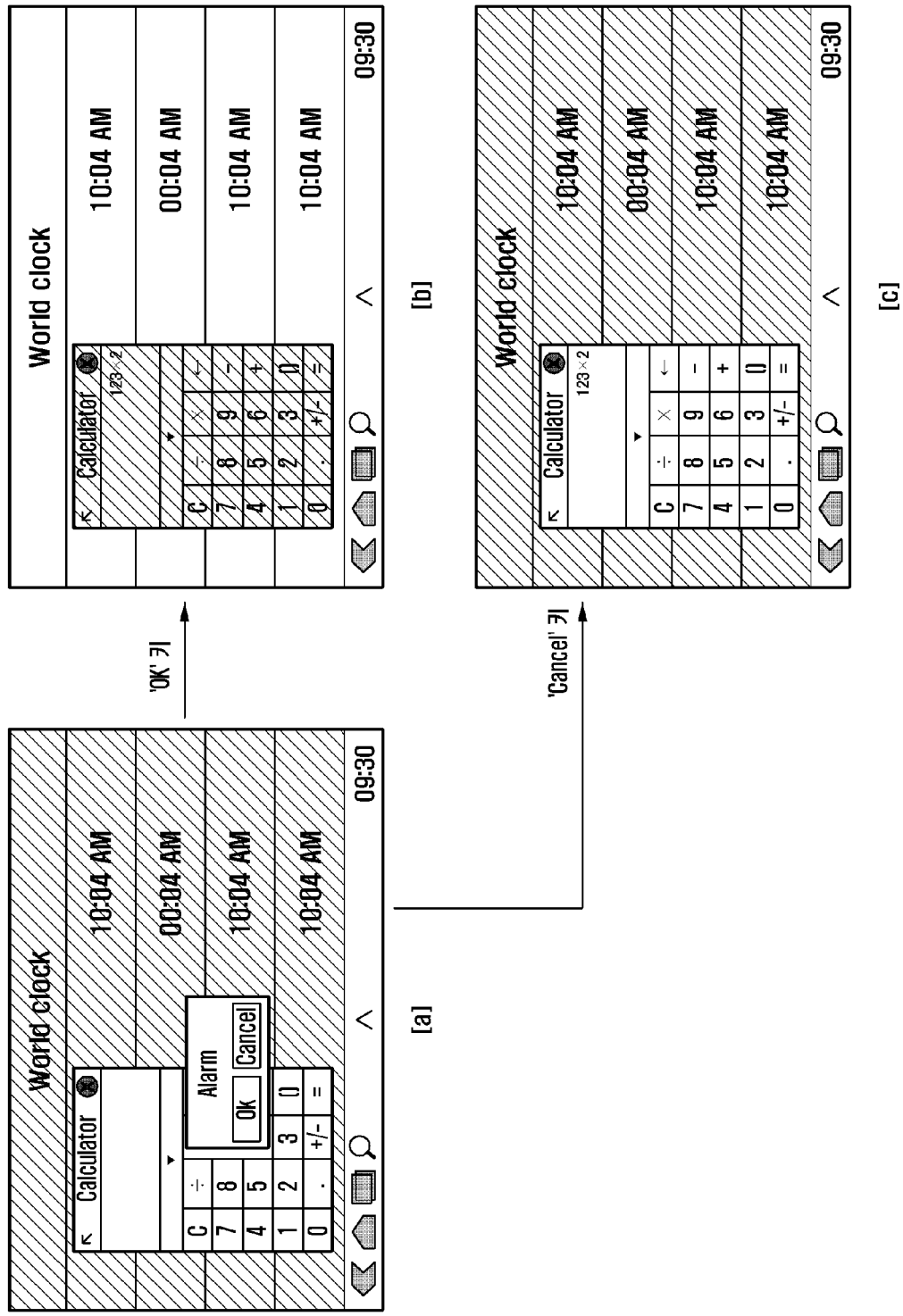
FIG. 13 is a view illustrating an example of a screenshot of a mobile terminal displayed in a procedure of FIG. 12.

FIG. 13 is a view illustrating an example of a screenshot of a mobile terminal such as displayed in the procedure of FIG. 12.

FIG. 13[*a*] illustrates a full mode execution screen of a world time application, a mini mode execution screen of a calculator application, a pop-up window, and an indicator region. FIG. 13[*a*] illustrates a display state on which a focus is displayed on a mini mode execution screen of a current calculator application, and a pop-up window indicating an alarm event occurring in a world time application is displayed on a foreground of a mini mode execution screen. An 'OK key' and a 'Cancel key' are included in the pop-up window.

FIG. 13[*b*] illustrates a screen changed where the touchscreen senses that a user inputs an 'OK key' in FIG. 13[*a*]. The focus is moved and displayed to a full mode execution screen of a world time application. FIG. 13[*c*] illustrates a screen changed where the user inputs a 'Cancel key' in FIG. 13[a], and a focus state of a mini mode execution screen of a calculator application continuously maintains.

In an exemplary embodiment of the present invention, the controller 150 may control the display unit 132 to display a plurality of mini mode execution screens on an application execution screen region. A plurality of mini mode execution screens may be displayed differently according to respective layers, and a focus may be located at a mini mode execution screen located at the uppermost layer. When the user inputs an execution command of another application in a displayed state of the mini mode execution screen, the controller 150 controls the display unit 132 to position a mini mode execution screen of an application to an execution command is input at the uppermost layer and to display a focus.

In an exemplary embodiment of the present invention, when the user inputs an execution command of another application in a display state in which the mini mode execution screen is displayed, the controller 150 controls the display unit 132 to eliminate a currently displayed mini mode execution screen and substitute and display a mini mode execution screen in which an execution command is input.

Figure 14:
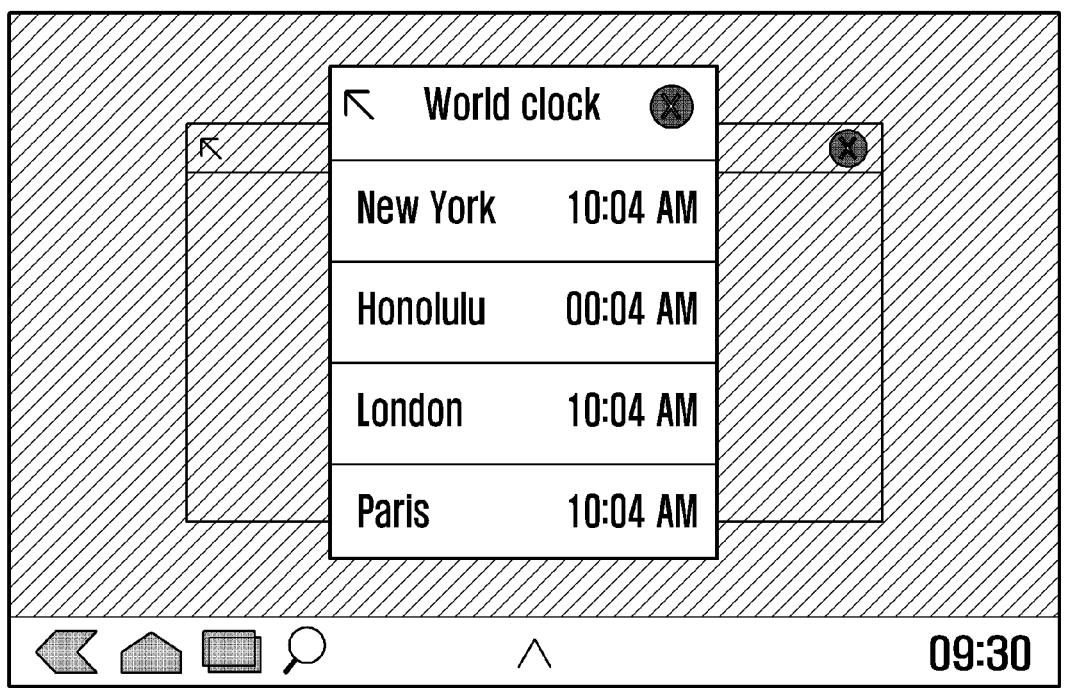
FIG. 14 is a view illustrating an example of a plurality of mini mode execution screens are displayed on an application execution screen region.

FIG. 14 is a view illustrating a format that a plurality of mini mode execution screens is displayed on an application execution screen region. In FIG. 14, a mini mode execution screen of a world time application is displayed on an uppermost layer, a mini mode execution screen of another application is located at a lower layer of a mini mode execution screen of a world time application. The user may input a focus change command of a mini mode execution screen through a flick operation of left and right directions or a touch operation to a mini mode execution screen.

In FIG. 14, if the touchscreen senses touch that user inputs a drag operation after touching a mini mode execution screen, the controller 150 controls the display unit 132 to move and display all displayed mini mode execution screen according to a touch location movement.

When the user inputs a flick operation of a left direction in FIG. 14, the controller 150 controls the display unit 132 to focus and display a mini mode execution screen located at a right side of a mini mode execution screen of a world time application. Further, when the user touches a mini mode execution screen located at a right side of the mini mode execution screen of a world time application, the controller 150 may control the display unit 132 to focus and display the touched mini mode execution screen.

In an exemplary embodiment of the present invention, the controller 150 may determine whether a touch location moving operation is input to a direction toward the indicator region after touching two points to a mini mode execution screen through the touch sensor 131. In this case, an input touch location moving operation is preferably a flick operation directly releasing a touch after a user touches two points and moves a touch location higher than preset speed. If the touchscreen senses a touch input that is determined by the controller to be a flick operation of touching two points, the controller 150 controls the display unit 132 to eliminate all of mini mode execution screens included in an application execution screen region and to display a remainder. In this case, the controller 150 continuously maintains an execution state of an application of a mini mode, and performs only a mini mode execution screen hide function.

In an exemplary embodiment of the present invention, the controller 150 may determine whether or not a touch location moving operation to a direction toward an indicator region after touching one point to a mini mode execution screen through the touch sensor 131. When the controller determines that the touch location moving operation is input, the controller 150 may terminate an application corresponding to a mini mode execution screen that the user touches.

In an exemplary embodiment of the present invention, a mini mode change key may be included in a full mode execution screen. If input of a mini mode change key is recognized through the touch sensor 131, the controller 150 controls the display unit 132 to change from a full mode execution screen to a mini mode execution screen and to display the changed mini mode execution screen. Further, an application termination key may be included in a full mode execution screen. In this case, the controller 150 determines whether an application termination key is input greater than a preset time. If it is determined that the application termination key is input greater than a preset time, the controller 150 controls the display unit 132 to change from a full mode execution screen to a mini mode execution screen and to display the changed mini mode execution screen. If the application terminal key is input less than the preset time through the touch sensor 131, the controller 150 terminates execution of an application and controls the display unit 132 to eliminate a full mode execution screen.

If the user input a mini mode change key included in a full mode execution screen in a state that both of a full mode execution screen and a mini mode execution screen are displayed, the controller 150 controls the display unit to change from a full mode execution screen to a mini mode execution screen, and to eliminate display of a currently displayed mini mode execution screen or locate and display it at a lower layer of a newly created mini mode execution screen.

Figure 15:
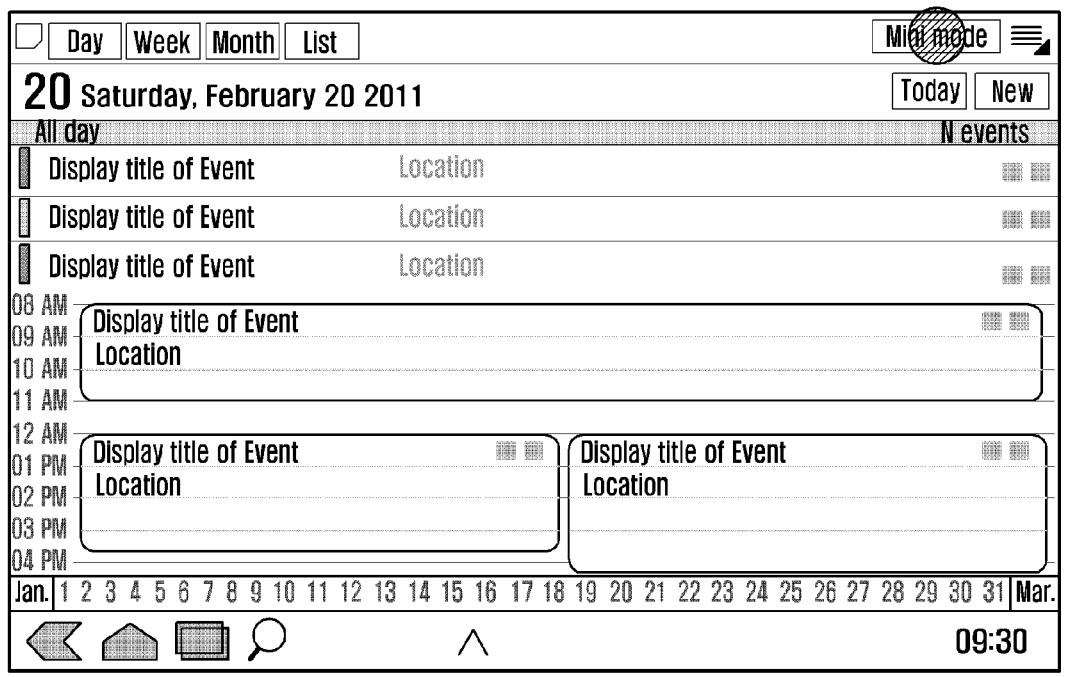
FIGS. 15 and 16 are views illustrating conversion forms from a full mode execution screen to a mini mode execution screen, respectively.
Figure 15:
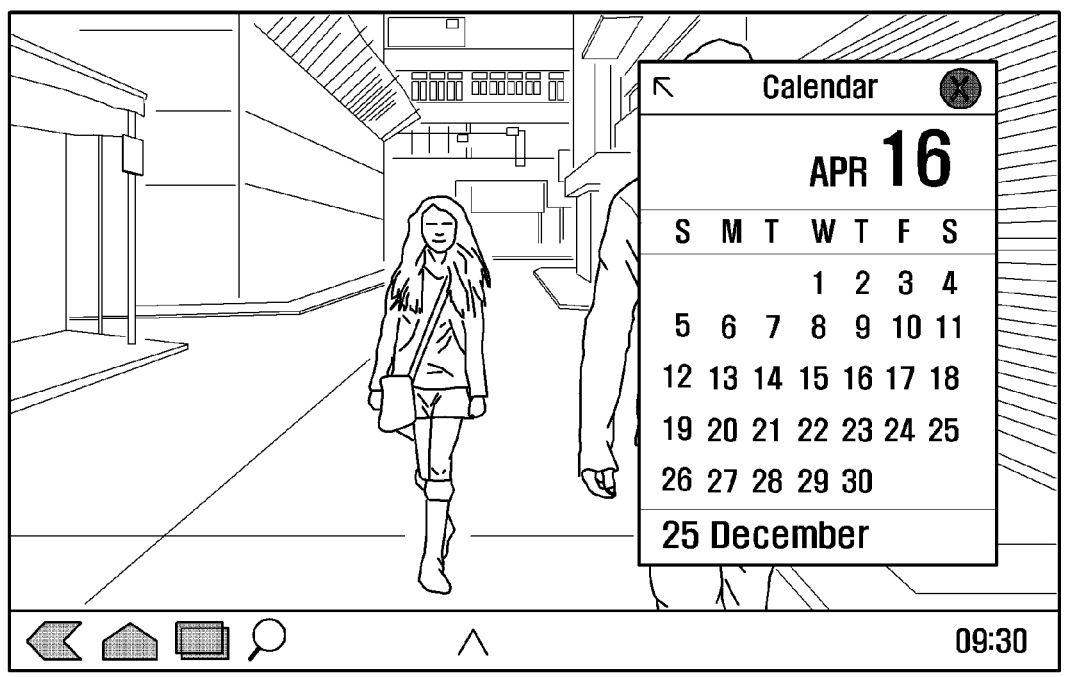
Figure 16:
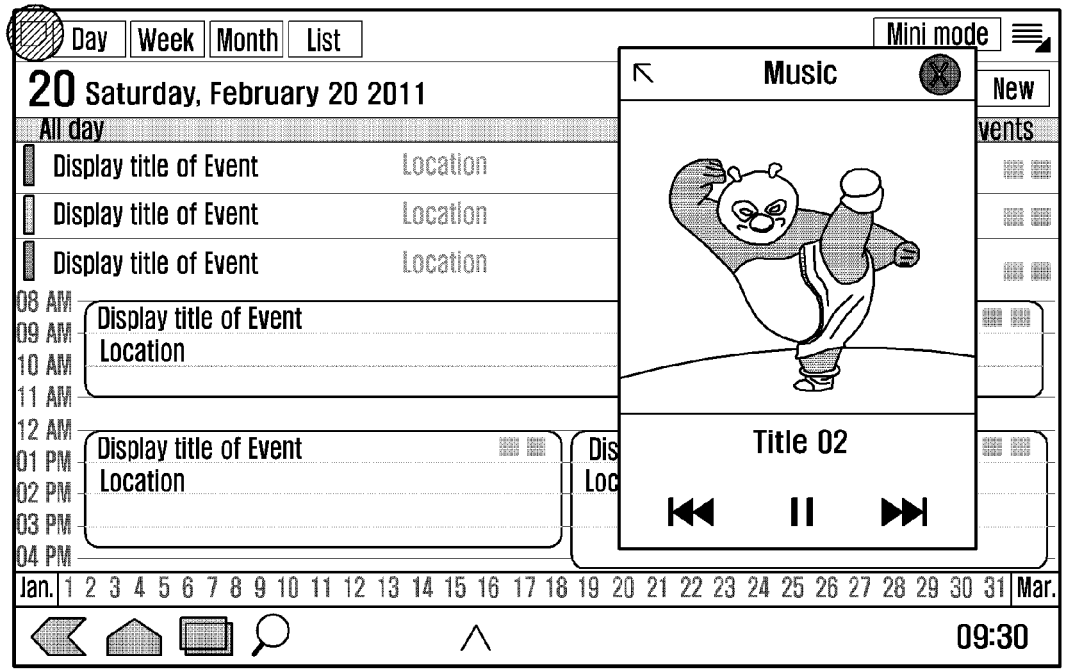
Figure 16:
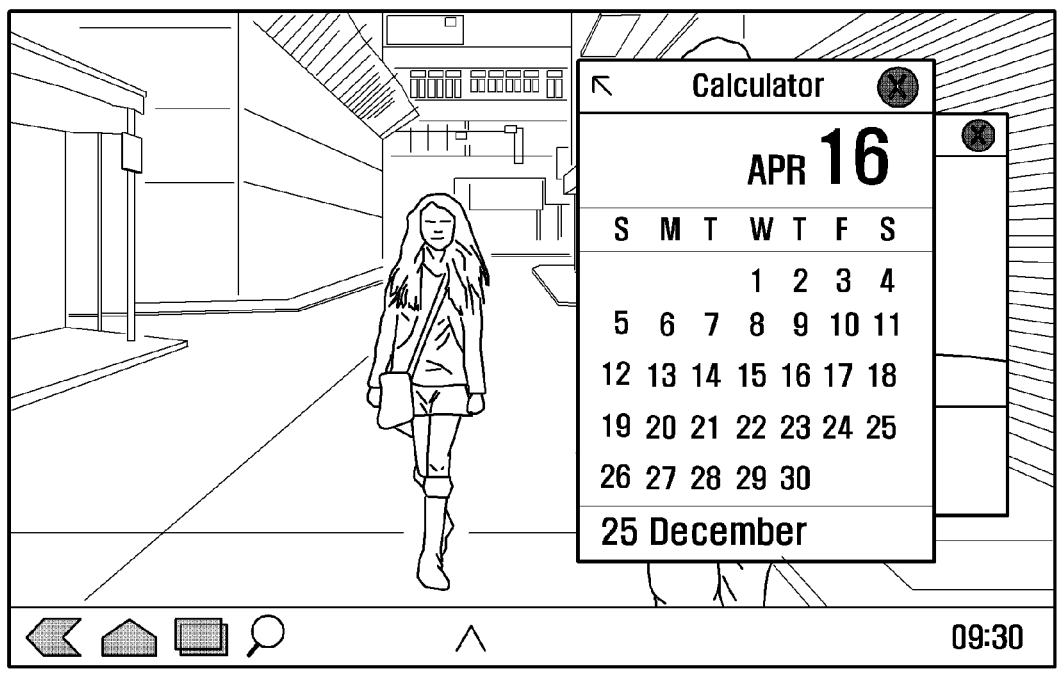

FIGS. 15 and 16 are views illustrating conversion various forms of display from a full mode execution screen to a mini mode execution screen, respectively.

FIG. 15[a] illustrates a full mode execution screen of a calendar application, and a form in which a touch is input to a mini mode change key. FIG. 15[b] is a screen changed from FIG. 15[a], and illustrates a form in which a calendar application is changed from a full mode execution screen to a mini mode execution screen.

FIG. 16[a] illustrates a full mode execution screen of a calendar application and a mini mode execution screen of a music playback application, and a form in which the user inputs a touch to an application terminal for greater than a preset time. FIG. 16[b] is a screen changed from FIG. 16[a], and illustrates a form in which a calendar application is changed from a full mode execution screen to a mini mode execution screen, and a mini mode execution screen of a calendar application is located at an upper layer of a mini mode execution screen of a music playback application.

In an exemplary embodiment of the present invention, when using a multi-tasking function of the mobile terminal, the user may view execution screens of a plurality of applications, and input an operation command for a plurality of applications on one screen.

In the present invention, when using a multi-tasking function of a mobile terminal, the user can view a plurality of application execution screens on one screen, and input an operating command for a plurality of applications on one screen. Because a command such as application execution, termination, hide, conversion from a mini mode to a full mode through a simple touch operation, convenience for the user may be improved in using the multi-tasking function.

In another example of the present invention, a mini mode tray is called by flicking a graphic cue region of an indicator region upward. After N seconds, the mini mode tray is automatically closed and an end button is tapped to close it. Upon execution and termination, 3D effect in which a stick is turned is applied.

Calling Mini Mode Application

The mini mode application can be called by tapping or dragging and dropping icons of respective application in a tray.

Termination of Mini Mode Application

The mini mode application can be dragged and dropped to a tray region or a termination button of a title region is tapped to terminal the mini mode application.

Transition Effect

A mini mode application is executed to apply an effect in which a tray is enlarged in termination time.

Execution of One Application at One Time

One mini mode application is called at one time. When another mini mode application is executed while using a specific mini mode application, a previously use mini application is closed and a new mini application is executed.

Association with Full Mode

Moving Method

Mini Mode Title Region Tap & Move

Input Field Contents are First Ones of Full Mode

Because full mode is more suitable to an input action, full mode is regarded as input intention and an input field is firstly applied in the full mode.

Operation According to Selection of Softkey when Pop-Up Occurs

When a pop-up occurs in a background application while using a mini mode application, if Confirmation command (Ok, confirm, done, delete, . . . ) is selected, focus is moved to a background application. When a cancel command (Cancel, No, . . . ) is selected, a focus is maintained in a mini mode application.

Background Sound Play

An icon is displayed at an indicator region at a lower end in a background sound play situation (Music, call), and an icon is tapped to execute a mini mode application.

Incoming Call

If an alarm occurs in an indicator region upon generation of a call, and the call is accepted, the mini mode is executed. While a user uses another mini mode application, a used application is closed and a call mini mode application is executed.

Effect of the Present Invention

The present invention allows a user to use a multi-tasking function similar to utilization of a PC in a mobile use environment.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, thumbnail, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method for providing a Graphic User Interface, in a mobile terminal, the method comprising:
   executing and displaying, by the mobile terminal, a full-mode execution screen of a first application on an application execution screen region;
   displaying, based on a control signal, a mini-mode execution icon region with the application execution screen region, the mini-mode execution icon region including one or more mini-mode execution icons; and
   executing and displaying, in response to an input for selecting one of the one or more mini-mode execution icons, a mini-mode execution screen of a second application corresponding to a selected mini-mode execution icon on the application execution screen region, the mini-mode execution screen comprising an execution screen configured to be a partial region of the application execution screen region while executing the first application,
   wherein when the first application is executing on the application execution screen region in full mode and the display of the mini-mode execution screen is hidden, in response to a selection of a mini-mode change key, changing display of the first application to the mini-mode execution screen, and changing display of the second application to the full mode execution screen in which the mini-mode execution screen overlaps the full mode execution screen on the application execution screen region.

2. The method of claim 1, wherein the first application and the executed second application provide different displays of a same application in the full-mode execution screen and the mini-mode execution screen, respectively.

3. The method of claim 1, wherein a focus is changed between the mini-mode execution screen and the full-mode execution screen based on a user control.

4. The method of claim 1, further comprising at least one of changing the display of the mini-mode execution screen to the full-mode execution screen based on a user control or changing the display of the full-mode execution screen to the mini-mode execution screen based on another user control.

5. The method of claim 4, wherein changing the display of the mini-mode execution screen to the full-mode execution screen based on the user control further comprises:
   displaying a full mode change key on the mini-mode execution screen;
   receiving selection of the full mode change key; and
   changing the mini-mode execution screen to the full mode execution screen and displaying a changed full-mode execution screen.

6. The method of claim 4, wherein changing the display of the full-mode execution screen to the mini-mode execution screen based on the user control further comprises:

displaying a mini-mode key on the full mode execution screen;

receiving selection of the mini-mode key; and changing the full-mode execution screen to the mini-mode execution screen and displaying a changed mini-mode execution screen.

7. The method of claim 1, wherein a full-mode execution icon region is displayed before displaying the first application, and the first application displayed on the full-mode execution screen is executed based on selecting a corresponding icon included in the full-mode execution icon region.

8. The method of claim 7, wherein the Graphic User Interface comprises a menu region, the menu region displaying one of the full-mode execution icon region, the mini-mode execution icon region or an indicator region comprising at least one function key, based on a user control.

9. The method of claim 1, further comprising:

determining whether or not a touch moving location of a touch from the mini-mode execution screen extends to the application execution screen region; and terminating execution of the second application of the touched mini-mode execution screen when the touch moving location extends to the application execution screen region.

10. The method of claim 9, wherein terminating execution of the second application of the touched mini-mode execution screen comprises displaying an image in which the mini-mode execution screen is reduced in size and converged to a corresponding application execution icon.

11. The method of claim 1, further comprising:

focusing and displaying the mini-mode execution screen;

determining whether an event occurs in the first application of the full-mode execution screen;

displaying a pop-up window including a confirm key and a cancel key on an upper layer of the mini-mode execution screen when the event occurs in the first application of the full-mode execution screen;

moving and displaying a focus to the full-mode execution screen when the confirm key is input; and maintaining a focus state of the mini-mode execution screen when the cancel key is input.

12. The method of claim 1, further comprising:

receiving an additional selection of another mini-mode execution icon from the mini-mode execution icon region; and displaying a mini-mode execution screen of a third application corresponding to the additionally selected mini-mode execution icon on an upper layer of a currently displayed mini-mode execution screen.

13. The method of claim 10, where the touched mini-mode execution screen is selected by a flick operation.

14. A mobile terminal for providing Graphic User Interface (GUI), the terminal comprising:

a display unit that displays an application execution screen region, an input unit that receives a user input; and a controller of the mobile terminal configured to:

execute a full-mode execution screen of a first application and control display of the full-mode execution screen of the first application on the application execution screen region;

control display, based on a control signal, a mini-mode execution icon region with the application execution screen region, the mini-mode execution icon region including one or more mini-mode execution icons; and in response to an input for selecting one of the one or more mini-mode execution icons, execute a mini-mode execution screen of a second application and control display of the mini-mode execution screen of the second application corresponding to a selected mini-mode execution icon on the application execution screen region, the mini-mode execution screen comprising an execution screen configured to be a partial region of the application execution screen region while executing the first application, wherein when the first application is executed on the application execution screen region in full mode and the display of the mini-mode execution screen is hidden, in response to a selection of a mini mode change key, change a display of the first application to the mini-mode execution screen that overlaps display of the second application, and change display of the second application to execution in the full mode on the application execution screen.

15. The mobile terminal of claim 14, wherein the controller is configured to control the display unit to display the application execution screen region including a concurrent display of the first application and the second application, to receive a touch location moving operation to the application execution screen region after a touch of the input unit, and to control the display unit to change the display of the application execution icon region.

16. The mobile terminal of claim 14, wherein the display comprises a touch screen and the selection is sensed by a touch sensor.

17. The mobile terminal of claim 14, wherein the input unit is configured to receive selection of at least one of the one or more mini-mode execution icons, and wherein the controller is configured to control changing the display of the mini-mode execution screen to the full-mode execution screen based on a user control, or changing the display of the full-mode execution screen to the mini-mode execution screen based on another user control, and wherein the display unit is configured to display a mini-mode execution screen of an application corresponding to the selected application execution icon on the application execution screen region.

18. The mobile terminal of claim 14, wherein the mini-mode execution screen and the full-mode execution screen provide different displays of a same application, respectively.

* * * * *